Nov. 22, 1938.     R. R. R. SARAZIN     2,137,591
VIBRATION DAMPING DEVICE
Filed July 18, 1936     2 Sheets-Sheet 1
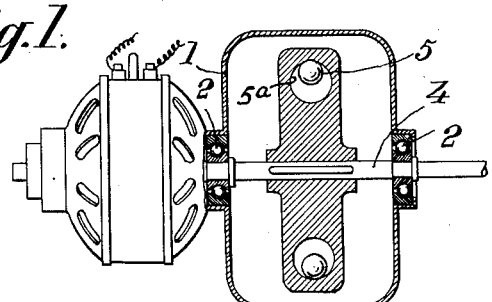
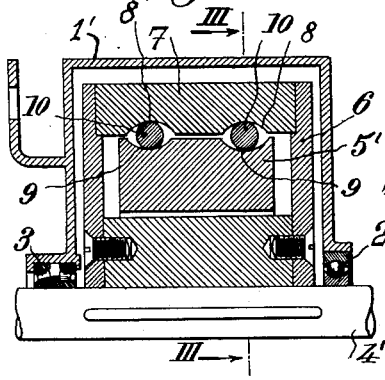 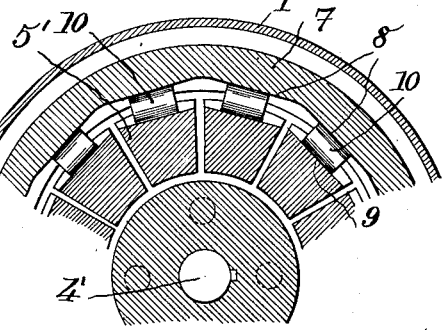
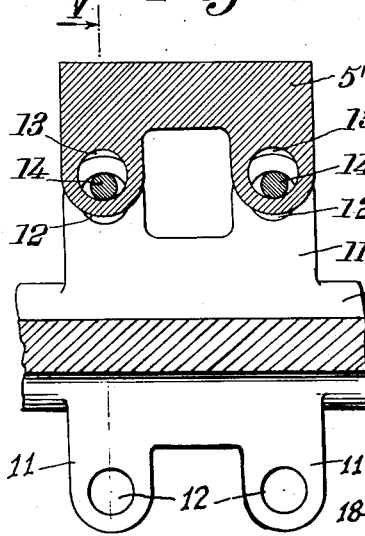 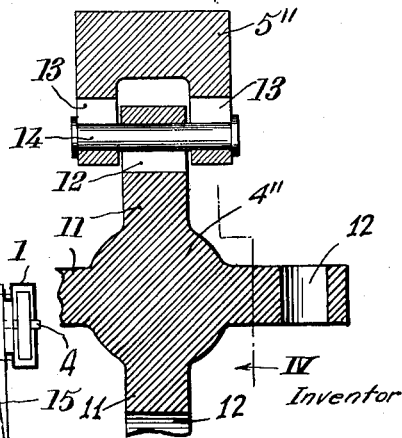
Inventor:
Raoul Roland Raymond Sarazin,
Barley & Carson
Attorneys

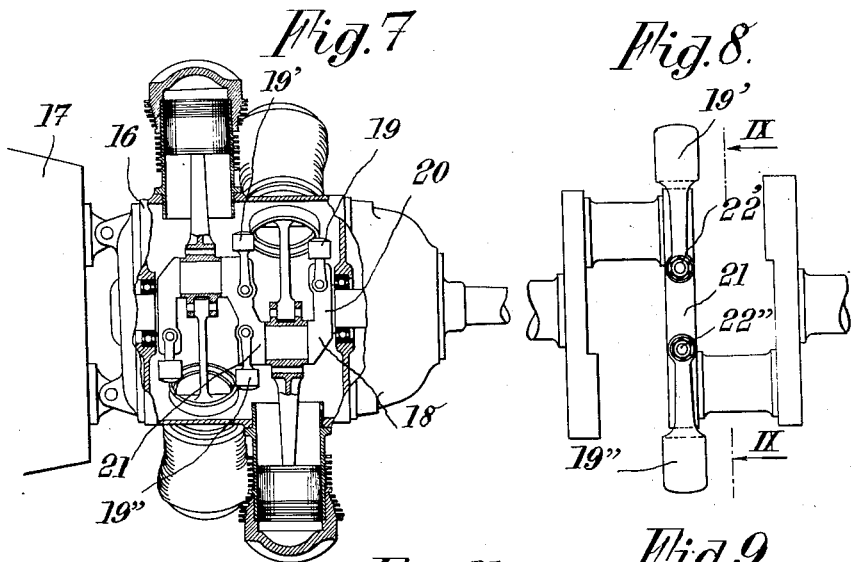
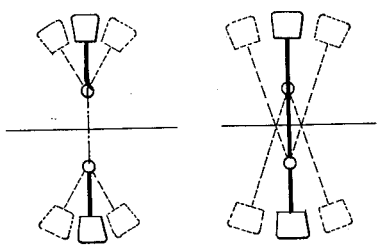
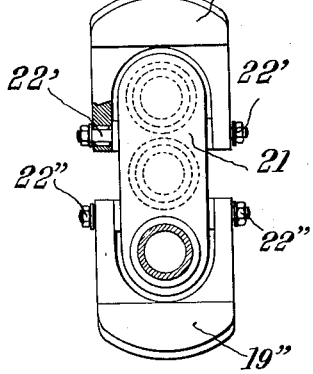
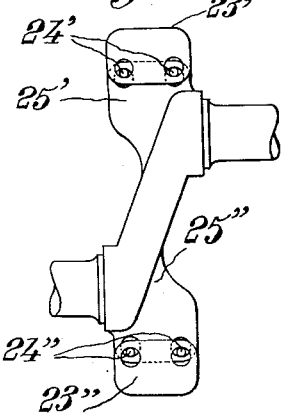
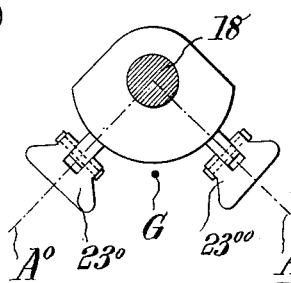
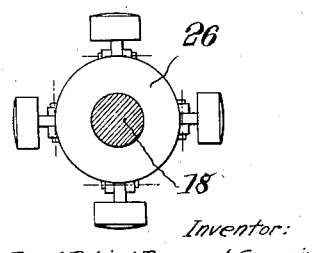

Patented Nov. 22, 1938

2,137,591

UNITED STATES PATENT OFFICE 2,137,591

VIBRATION DAMPING DEVICE

Raoul Roland Raymond Sarazin, Saint-Prix, France

Application July 18, 1936, Serial No. 91,443
In France July 24, 1935

11 Claims. (Cl. 188—1)

The present invention relates to devices for damping vibrations, and more especially those resulting from the working of engines.

The object of the present invention is to provide a device of this kind which is better adapted to meet the requirements of actual practice than similar devices used for this purpose up to the present time.

The essential feature of the present invention consists in providing a movable mass, adapted to rotate together with a rotating shaft, said mass being connected to said shaft so as to be able to oscillate with respect thereto with a pendular motion in a radial plane of the shaft in the field of the centrifugal force resulting from the rotation of said shaft, whereby, when the point at which said mass and said shaft are connected together undergoes vibrations having at least one component parallel to said shaft, the pendulum thus formed starts oscillating in such manner that the resultant of the forces applied to said mass tends to damp these vibrations or at least to reduce them.

Other features of the present invention will result from the following detailed description of some specific embodiments thereof.

Preferred embodiments of the present invention will be hereinafter described, with reference to the accompanying drawings, given merely by way of example, and in which:

Fig. 1 diagrammatically shows, in radial section, a vibration damping device made according to the present invention;

Fig. 2 is an axial sectional view of a vibration damping device according to another embodiment of the present invention;

Fig. 3 is a sectional view on the line III—III of Fig. 2;

Fig. 4 is a sectional view on the line IV—IV of Fig. 5, of a device of the same kind made according to a third embodiment of the invention;

Fig. 5 is a sectional view on the line V—V of Fig. 4;

Fig. 6 shows, on a reduced scale, a device such as that shown by Figs. 2 and 3 mounted on the cylinder group of an engine the cylinders of which are arranged in line;

Fig. 7 diagrammatically shows, in vertical section, a radial engine with two banks of cylinders fitted with vibration damping devices according to the present invention;

Fig. 8 is a lateral view of the crankshaft of an engine of the same kind, provided with vibration damping devices according to the present invention;

Fig. 9 is a sectional view on the line IX—IX of Fig. 8;

Figs. 10 and 11 are diagrammatical views illustrating modifications of the embodiment shown by the preceding figures;

Fig. 12 is a view, similar to Fig. 8 showing a crankshaft provided with a vibration damping device according to another embodiment of the invention;

Figs. 13 and 14 are views, similar to Fig. 9, showing two driving shafts provided with means for damping vibrations, according to the present invention.

In a general way, the device according to the present invention is intended to be fitted on an element liable to undergo vibrations, and said device, which is intended to damp or reduce these vibrations, is made as follows:

On a suitable frame, for instance a casing 1, adapted to contain the whole mechanism, there is mounted a shaft 4 adapted to be rotated through any suitable means, said shaft being journalled in bearings capable of acting as thrust bearings, for instance ball bearings 2 with deep grooves or conical roller bearings 3, as shown by Figs. 1 and 2, respectively.

Said shaft is connected with a plurality of movable masses 5, preferably in the form of spheres or balls, capable of constituting a statically balanced system, in such manner that these masses can oscillate with respect to shaft 4 in the manner of pendulums capable of oscillating as freely as possible (preferably with the interposition of rolling elements such as rollers or needles), in radial planes of the shaft, in the field of the centrifugal force.

This structure is such that, if the various elements have been suitably determined and if the speed of revolution of shaft 4 is of the desired value, when said structure is fixed, through its frame to a vibrating element in such manner that the axis of shaft 4 is parallel to the direction of the vibrations (or of the components of the vibrations) to be damped, the pendulums start oscillating in such manner that the resultant of the forces applied to masses 5 tends to damp said vibrations or components of vibrations.

According as the case may be, and especially according to the frequency of the vibrations, the pendulums constituted by masses 5 and the means for connecting them with shaft 4 may be monofilar pendulums or bifilar pendulums, that is, a mass suspended by either one cord, or by two parallel cords, respectively.

When it is advisable to make use of monofilar pendulums, any suitable embodiment may be employed. However, it is particularly advantageous to provide, inside a fly-wheel keyed on shaft 4, recesses having an internal surface 5a in the shape of circular radial section against which mere rollers or balls (constituting masses 5) may be applied by the centrifugal force. These rollers or balls are guided along circular paths. The radius of each path is of course equal to the radius of the curved surface 5a minus the radius of the ball 5.

When, now, it is advantageous to make use of bifilar pendulums, I may, for instance employ arrangements such as those illustrated, by way of example, by Figs. 2 and 3 on the one hand, and 4 and 5, on the other hand.

According to the first of these embodiments (Figs. 2 and 3), within housing 1' there is keyed on shaft 4' a hollow casing 6 including a peripheral annular portion 7 in the inner face of which are provided two substantially annular grooves 9 the sections of which by planes passing through the axis of shaft 4' are circular arcs but the outlines of which, observed in a direction at right angles to the plane of Fig. 2, are polygonal.

Inside this casing are housed the movable masses 5', which are given the shape of truncated sectors as shown by Fig. 3, and which are provided, on their outer sides, with grooves 9 of a section corresponding to that of grooves 8, and arranged to be positioned opposite said grooves 8.

Finally, I interpose between grooves 8 and 9 rolling elements such as cylindrical rollers 10, of a radius equal to $r^1$, said grooves being adapted, when masses 5' are urged by the centrifugal force during the rotation of casing 6, to guide said masses as if they were bifilar pendulums the center of gravity of which would always remain in the same radial plane turning together with shaft 4''.

It will be readily understood that, with this arrangement, if grooves 8 and 9 have a radius equal to $r^2$, masses 5' will move with respect to the shaft 4 under the effect of the vibrations in such manner that their centers will form paths in the shape of circular arcs having a radius equal to $$2(r^2 - r^1)$$

In the second of the embodiments above referred to (Figs. 4 and 5), I distribute at equal intervals, about shaft 4'', radial plates 11 which are provided, in two points (preferably equally distant from the axis of revolution of the shaft) with circular holes 12.

Masses 5'' are made of such a shape that they surround plates 11 on either side of which are then located two lugs which are provided with circular holes 13, located at the same distance from each other as holes 12.

In each set of corresponding holes 12—13, there is inserted a roller 14, of a diameter smaller than the respective diameters of said holes.

Such an arrangement is tantamount, as for its working and its effects, to that above described with reference to Figs. 2 and 3.

In any case, these devices may be employed for damping vibrations of various kinds.

For instance, when it is desired to damp the transverse vibrations of the cylinder group of an engine 15 the cylinders of which are arranged in line (Fig. 6), it suffices to fix casing 1 laterally to said group of cylinders, shaft 4 being then rotated through any suitable means. As shown in Fig. 6, for example, belt pulley 17 is keyed to motor shaft 16, and through belt 18 drives pulley 19, gear 20, and shaft 4.

On the contrary, if it be desired to damp the vibrations of a vibrating piece such as an airplane wing set into vibration either by the vibrations of the engine, or by aerodynamic phenomenons, the device may be fixed at any suitable place, for instance at the place where the vibrations are of the highest amplitude. In this case, the device may be driven by an independent motor, such for instance as an electric motor (Fig. 1).

In the preceding description, I have referred more especially to devices in which the driving shaft 4 did not consist of the shaft of an internal combustion engine.

But the present invention also applies to devices for damping certain particular vibrations to which certain types of machines are subjected, such as internal combustion engines or parts of machines, these particular vibrations being characterized, for at least some points of the driving shaft, by paths different from circles of revolution about the theoretical axis of rotation of said shaft.

In order to damp these vibrations, according to the present invention, I mount in a pivoting manner at least one pendulum on the driving shaft at a point remote from the axis of said shaft, in such manner that this pendulum can oscillate in the longitudinal direction of the shaft.

With such an arrangement, in the course of the rotary movement of the shaft, this pendulum is subjected to the action of the centrifugal force and, if the trajectory of the axis along which the pendulum is pivoted to the shaft does not correspond with a circle of revolution about the theoretical axis of revolution of said shaft, this pendulum does not undergo any oscillation.

On the contrary, if the zone in question moves with a motion having a component parallel to the axis of revolution, the pendulum is started into oscillation and it exerts its vibration damping action.

In practice, this case may occur for instance in the following circumstances:

When the engine is supported in an overhung position with a rigidity which is not sufficient in order that the axis of revolution of the driving shaft may remain stationary, which is the case, for instance, of radial engines fitted on aircrafts and supported at the front or at the rear of the fuselage or a nacelle.

Another case is when, in an engine, the crankshaft itself is not sufficiently rigid.

Examining first the first case, it is found that, especially when elastic fixation devices are interposed between engine 16 and its support 17, the axis of revolution of the driving shaft moves along a kind of cone, generally more or less deformed, in such manner that the whole of the engine is given an irregular movement analogous to that of a spinning top. This takes place more especially in the case of radial engines having several banks of cylinders.

It then suffices to fit, in the manner above indicated, to the crankshaft 18 of said engine, at least one pendulum 19, for greatly reducing this objectionable movement.

I may, for instance, as shown by Fig. 7, fix this pendulum at a certain distance from the axis of revolution on web 20 which is at the greatest distance from the part of the engine fixed to support 17. The pendulum can then replace, at least partly, the balancing counterweight which was generally disposed at this place. In this case this pendulum will play the part of both a counterweight and a vibration damping device.

One might also, for instance in the case of a double radial engine (that is to say a radial engine including two banks of cylinders) provide two pendulums 19', 19" (Figs. 7 to 9) both pivoted, on either side of the axis of revolution, to the web that connects together the two crank pins of the crankshaft. These pendulums can then be made as shown by Fig. 9 that is to say they may be given the shape of C surrounding one of the ends of web 21, to which each branch of the C would be connected through spindles 22', 22", advantageously provided with ball bearings or with roller bearings.

Anyway, the vibration damping effect will be obtained if the mass of the pendulums and their period of oscillation are suitably chosen, which may be obtained, in every case, either experimentally or through calculations.

When, as this often occurs in practice, the vibrations to be damped have a frequency equal to one (or more accurately a frequency equal to the number of turns of the driving shaft per second) the pendulums to be utilized should generally be monofilar pendulums. In any case they should be pivoted at points remote from the axis of revolution. These points may be, with respect to said axis, either on the same side as the center of gravity of the pendulum (Figs. 7 to 10) or on the opposite side (Fig. 11).

Examining now the case of the damping of bending deformations of crankshafts, it is found that it is generally advisable to make use of bifilar pendulums which, in this case also, are pivoted to the webs of the crankshafts. These pendulums may, for instance, be made as described with reference to Figs. 4 and 5, each of them including a mass, 23' or 23" (Fig. 12) provided with holes through which pass, with a certain play, rollers 24', 24" which extend, also with a certain play, through holes provided in an element 25', 25", rigid with the crankshaft.

Of course, whether the pendulums that are employed are monofilar pendulums or bifilar pendulums, it may, in some cases, be advantageous to provide pendulums capable of oscillating in different radial planes, these radial planes being, for instance, at right angles to each other.

Thus, according to the circumstances, the following arrangements may be adopted:

a.—I dispose, on the same web of a crankshaft, two pendulums, for instance bifilar pendulums, 23⁰, 23⁰⁰ (Fig. 13), adapted to oscillate in radial planes A⁰, A⁰⁰ at right angles to each other. The center of gravity of the whole of these two pendulums is located at the point where should be positioned the center of gravity of the balancing counterweight of the crank pin carried by the web in question, if pendulums 23⁰, 23⁰⁰ did not exist;

b.—I dispose, upon the same plate 26, rigid with shaft 18, four pendulums, for instance monofilar pendulums, evenly distributed at 90° from one another about the shaft, as illustrated by Fig. 14.

Of course, many other arrangements of the same kind might be employed, according to the nature of the vibration to be damped.

The operation and the advantages of a vibration damping device according to the present invention result sufficiently clearly from the preceding description of some specific embodiments for making it unnecessary to give any further explanation.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device for damping the vibrations of a structure which comprises, in combination, a support rigidly connected to said structure, a shaft journalled in said support and parallel to at least a component of said vibrations, means for rotating said shaft, a fly-wheel keyed on said shaft, said fly-wheel being provided with recesses of circular radial section, and masses guided in the longitudinal direction of said shaft in said recesses respectively.

2. A device for damping the vibrations of a structure which comprises, in combination, a support rigidly connected with said structure, a rotating shaft journalled in said support and parallel to at least a component of said vibrations, and a plurality of masses distributed around said shaft and connected thereto in a bifilar pendular manner, so as to be able to oscillate in radial planes of said shaft, respectively.

3. A device for damping the vibrations of a structure which comprises, in combination, a support rigidly connected with said structure, a rotating shaft journalled in said support and parallel to at least a component of said vibrations, a hollow cylindrical casing keyed to said shaft, coaxially therewith, the inner wall of the outer cylindrical part of said casing being provided with two peripheral notches, of arcuate section in radial planes of the shaft, a mass housed in said casing, said mass being provided with two notches facing the two first mentioned notches, respectively, and of corresponding radial section, and rolling elements engage in both pairs of grooves.

4. A device according to claim 3 in which the first mentioned notches are of polygonal section in a plane at right angles to said shaft.

5. A device for damping the vibrations of a structure which comprises, in combination, a support rigidly connected with said structure, a rotating shaft journalled in said support and parallel to at least a component of said vibrations, at least two lugs carried by said shaft, located in the same radial plane of said shaft, a mass movable with respect to said shaft, at least two lugs carried by said mass, located in the same radial plane of said shaft, the respective lugs of said shaft and said mass being provided with overlapping circular holes, and rolling members extending through the holes of two corresponding lugs of said shaft and said mass respectively, said members being of a diameter smaller than that of said holes so as to permit bifilar pendular displacement of said mass with respect to said shaft in the radial plane thereof.

6. A device for reducing linear vibrations of a non-rotating structure, which comprises, in combination, a rotating shaft associated with said structure and arranged in such a manner that the axis of said shaft is parallel to at least a component of said vibrations, means for transmitting said vibrations to said shaft so as to impart to said latter a longitudinal movement, and at least one mass movably carried by said shaft in such a manner as to be capable of oscillating with respect thereto with a pendular motion in the longitudinal direction of said shaft, whereby the pendulum thus formed starts oscillating in such manner that the resultant of the forces applied to said mass tends to damp these vibrations.

7. A device for reducing vibrations of a structure according to claim 6 in which said means are constituted by thrust bearings arranged between said structure and said shaft.

8. A device for damping the vibrations of a rotating shaft, which vibrations have at least a component in the longitudinal direction of said shaft comprising at least one mass connected to said shaft in a bifilar pendular manner, so as to be able to oscillate in a radial plane through the axis of said shaft.

9. A device for damping the longitudinal vibration of a rotating shaft, comprising a mass, and means at two points of said mass spaced longitudinally of said shaft to guide the mass to move in arcs in a plane radial to and passing through the axis of the shaft.

10. A device for damping the vibrations of a non-rotating structure, which comprises, in combination, a casing attached to said structure, a shaft rotatably mounted in said casing, and means for transmitting oscillations of said casing to said shaft in a direction longitudinally thereof, and at least one mass movably carried by said shaft in such a manner as to be capable of oscillating with respect thereto with a pendular motion in the longitudinal direction of said shaft, whereby the pendulum thus formed starts oscillating in such manner that the resultant of the forces applied to said mass tends to damp these vibrations.

11. In a device according to claim 6 for reducing the vibrations of a motor support having a motor mounted thereon, means connecting said shaft to the motor to be driven thereby at a speed proportional to the speed of the motor.

RAOUL ROLAND RAYMOND SARAZIN.